(No Model.)
A. PAGE.
NUT LOCK.
No. 417,580. Patented Dec. 17, 1889.
Fig. 1.
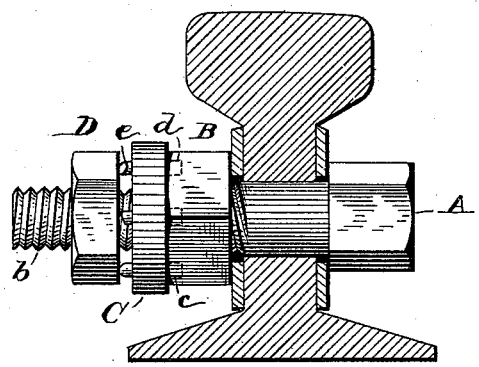
Fig. 2.
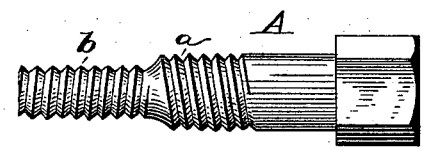
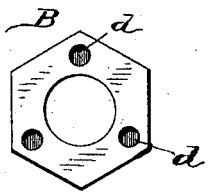
Fig. 3.
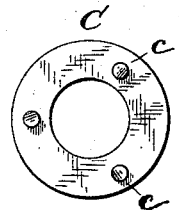
Fig. 4.
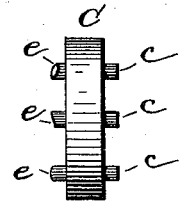
Fig. 5.
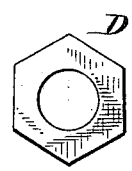
Fig. 6.
Witnesses
H. D. Kealy
E. F. Drew
Inventor
Abraham Page
By his Attorney
M. D. Peck

UNITED STATES PATENT OFFICE.

ABRAHAM PAGE, OF CORTLAND, NEW YORK.

NUT-LOCK.

SPECIFICATION forming part of Letters Patent No. 417,580, dated December 17, 1889.

Application filed June 26, 1889. Serial No. 315,572. (No model.)

*To all whom it may concern:*

Be it known that I, ABRAHAM PAGE, a citizen of the United States, residing at Cortland, in the county of Cortland and State of New York, have invented certain new and useful Improvements in Nut and Bolt Locks; and I do hereby declare the following to be a full, clear, and exact description of the invention, such as will enable others skilled in the art to which it appertains to make and use the same, reference being had to the accompanying drawings, which form part of this specification.

My invention relates to devices for locking and securing nuts upon screw-bolts to prevent the same from becoming loose or working off, and has for its object to provide a jam-nut to secure the main or holding nut and a collar or washer located between the main nut and the jam-nut, the collar having on its opposite faces projecting pins or teeth to engage both nuts to prevent the unscrewing of the jam-nut; and, further, to provide a bolt with two sections of thread, one section being a right-handed and the other a left-handed—one to receive the main or holding nut and the other the jam-nut—and in placing between the two nuts a collar or washer provided on opposite faces with pin-holding teeth to engage both nuts, and thereby prevent the jam-nut from working loose; and it consists in the peculiar construction and in the combination of parts, as hereinafter described, and more particularly pointed out in the claims.

In the accompanying drawings, which illustrate my invention and form a part of this specification, Figure 1 is a part sectional elevation showing my locking device in connection with a railway-rail. Fig. 2 is a side view of the bolt provided with right and left hand screw-threads. Fig. 3 is an outer face view of the main or holding nut. Figs. 4 and 5 are respectively face and edge views of the collar or washer, and Fig. 6 is a face view of the jam-nut.

A designates the bolt, which is formed with two threaded sections *a* and *b*, the thread of one section being right-handed and that of the other left-handed. As represented in the drawings, the upper or inner section *a*, which receives the main or holding nut, has the right-hand thread, and the outer section *b* the left-hand thread. The arrangement is immaterial, and may be reversed without affecting the operation of the device, provided the pin-holding teeth of the collar or washer are correspondingly changed, as will hereinafter appear.

B designates the main or holding nut, in the outer face of which are formed equidistant holes or cavities *d*, for a purpose to be explained.

C represents a collar or washer which lies against the outer face of the nut B, and which has projecting pins *c*, which correspond with and enter the holes or cavities *d*, whereby the washer is prevented from turning independently of the nut. On the opposite or outer face of the washer are other equidistant pin-holding teeth *e*, the ends of which are beveled or inclined to form sharp cutting-edges at the sides.

D designates the jam-nut, which is an ordinary nut made of soft iron or other soft metal. This nut subserves the purpose of an ordinary jam-nut; but instead of lying directly against the main or holding nut B it works against the washer C, which is interposed between it and the nut B.

The manner of applying and using the lock is as follows: The bolt A being placed in position, the holding-nut B is applied in the usual manner and screwed up to its seat. The washer C is then placed upon the end of the bolt against the nut B, with the pins *c* projecting into the holes or cavities *d*, where it is held against the nut in dependent rotation. The jam-nut D is now applied and is screwed up against the washer C, or rather against the beveled equidistant pin-holding teeth *e*, which project from the face thereof. The said teeth being beveled or inclined in the direction in which the nut turns when being screwed on, the nut rides over the beveled ends of the teeth without impediment until it is firmly seated. Any backward movement is prevented by the sharp edges of the teeth *e*, which cut or dig into the nut and prevent it from turning.

It will be understood that the holding action of the washer and its pins will be the same, whether used on a double or single threaded bolt. The double-threaded bolt, however, has this advantage, that the locking may be effected at any point, whether the nut B is screwed up against its seat or not, any tendency of the latter to turn with the jam-nut in effecting a lock serving to draw the parts together and causing the teeth e to cut into and embed themselves in the jam-nut, whereas on a single-threaded bolt the tendency would be for the two nuts to move together, in which case it would be necessary to hold the nut B while the nut D was being screwed up.

While the drawings show three pins on each face of the washer C, it is to be understood that any number may be used; also, while the device is shown as applied to a railway-joint, it is intended for general use.

Having thus fully described my invention, what I claim as new, and desire to secure by Letters Patent of the United States, is—

1. In a nut-lock, the combination, with a nut having holes or cavities in its outer face, of a washer having on one face projecting pins adapted to enter the said holes in the nut, and on its opposite face beveled or inclined equidistant pin-holding teeth with sharp cutting-edges, and a jam-nut to be screwed against said holding-teeth, as set forth.

2. In a nut-lock, the combination, with a bolt provided with right and left hand screw-threads, of a main or holding nut B, having cavities in its outer face, a washer C, provided on one face with projecting pins c, adapted to enter the cavities in the nut to prevent the two parts from turning relatively to each other, and on its opposite face with beveled holding-teeth e, having sharp cutting-edges, and a jam-nut adapted to be screwed against said holding-teeth, as set forth.

In testimony whereof I affix my signature in presence of two witnesses.

ABRAHAM PAGE.

Witnesses:
A. R. PECK,
JAMES DOUGHERTY.